Patented June 12, 1945

2,378,007

UNITED STATES PATENT OFFICE 2,378,007

PROCESS OF MODIFYING THE MOLECULAR STRUCTURE OF OILS AND FATS

Eddy W. Eckey, Wyoming, Ohio, assignor to The Procter & Gamble Company, Cincinnati, Ohio, a corporation of Ohio No Drawing. Application October 30, 1942, Serial No. 463,899

18 Claims. (Cl. 260—410.7)

This invention relates to a process for altering the composition of fats and fatty oils which, for convenience, I shall refer to collectively hereinafter in the specification and claims as "fats." More specifically the invention relates to a process for changing the fatty acid composition of glycerides contained in fats.

It is an object of my invention to provide an improved process whereby natural fats may be altered in physical properties.

A further object is to provide a process for changing the fatty acid composition of natural fats.

A special object is to provide a process whereby the combined fatty acids of lower molecular weight in a fat are replaced with fatty acids of higher molecular weight.

In my copending application Ser. No. 418,592, filed November 10, 1941, I have described and claimed a method whereby changes in fat composition are effected by subjecting a mixture of the fat and free fatty acid derived from the same fat or other fat to heat treatment under a fractionating column under such temperature and pressure conditions that vaporization of free fatty acids will take place, the fractionating column being operated so that the more volatile acids vaporized will distill off while the less volatile acids are condensed in the column and returned to the reaction zone, there to react with the glycerides and exchange with more volatile combined fatty acids.

The present process is a further improvement over the art and an improvement over the process covered in the said copending application in that a mixture of a fat and a suitable fatty ester or mixture of same derived from a monohydric alcohol having less than five carbon atoms is subjected to heat treatment under a fractionating column under such temperature and pressure conditions that simultaneous molecular rearrangement and vaporization of monohydric alcohol esters takes place, the refluxing column being operated so that only the more volatile monohydric alcohol esters and therefore the esters of only the more volatile fatty acids are distilled off while the remainder are condensed in the refluxing column and returned to the reaction vessel wherein further ester interchange takes place.

Methods have heretofore been employed for the interaction of simple mixtures of esters and separation into highest and lowest boiling reaction products, but these methods have not been found applicable to effecting efficient separation of complicated mixtures of esters such as are found in the natural fats and fatty oils.

The process of my invention is particularly applicable to the simultaneous removal of lower boiling acids from and reconstitution of natural fats such as coconut oil, palm kernel oil, and the like which are then particularly valuable because of their high content of $C_{12}$ and $C_{14}$ fatty acids. Of course the invention is not limited to this application. Other changes in glyceride composition can be effected by suitable choice of monohydric alcohol ester with which the glyceride is reacted. Molecular rearrangement will be effected whenever the monohydric alcohol ester added to the glyceride is a fatty acid ester having a higher boiling point than the corresponding ester of an acid combined in the glyceride. Thus an oil such as coconut oil containing a rather large proportion of $C_8$ and $C_{10}$ acids may be converted into a glyceride of higher melting point by mixing the same with methyl stearate, for example, and subjecting to treatment in accordance with the present invention and effecting replacement of at least part of the $C_8$ and $C_{10}$ acids with stearic acid.

On the other hand, palm oil, which contains a rather large proportion of combined palmitic acid, may be converted into a softer fat by mixing with ethyl oleate and applying the present process so that oleic acid replaces palmitic acid with the formation of ethyl palmitate which is removed by distillation through the fractionating column, any higher boiling ester volatilized such as unreacted ethyl oleate being refluxed and returned to the reaction zone as above set forth in the description of the invention.

Whether or not a catalyst should be employed in conjunction with the heat treatment and simultaneous fractional distillation under the fractionating column is dependent upon the final use designed for the product. Conditions may be employed whereby the glyceride alteration and fractional distillation with reflux will take place in the absence of the catalyst, but of course the reaction proceeds considerably slower and therefore a longer time will be necessary to effect the desired degree of modification. In the case of some fats the necessary prolonged treatment at high temperature required when no catalyst is used is injurious to color and may cause considerable polymerization and thermal decomposition. In such instances it is advisable to use a catalyst which will accelerate the reaction so that the fat is subjected to elevated temperature for a minimum length of time. For obvious reasons it is usually preferable to employ a catalyst, but it should be understood that the present invention is not limited to this feature.

The catalysts which may be employed in the type of reaction herein involved are those ester interchange catalysts known in the art, zinc soap especially being useful. Soaps of aluminum, magnesium and tin may find usefulness in some instances. Since it is feasible to conduct the rearrangement and simultaneous fractional distillation under reflux at relatively low temperatures when the volatile alcohol ester interchange process of the present invention is employed, it is also possible to employ small amounts of those catalysts which are especially active in molecular rearrangement processes at low temperature, such the alkali metal alkoxides preferably of those alcohols employed in the molecular rearrangement process, that is, the alkali metal alkoxides of monohydric alcohols having less than five carbon atoms.

In my study of the process herein described, I have found that for reasons not fully understood, alkali metal alkoxide catalysts lose their effectiveness after the reaction has been allowed to progress for some time, but I have found that whatever the cause may be, it is avoided if, during the molecular rearrangement and simultaneous fractionation under reflux, a vapor of a monohydric alcohol having less than five carbon atoms, preferably but not necessarily, of the monohydric alcohol employed in the preparation of the fatty acid esters is bubbled into the reaction mixture and allowed to escape through the fractionating column. The amount of alcohol used for this purpose does not appear to be critical and for economic reasons I prefer to use small amounts such as two per cent to ten per cent by weight based on the mixture of fat and monohydric alcohol ester, although a larger amount such as twenty-five per cent may be employed without detrimental effect.

The following example will illustrate a practical method for practicing my process, potassium methoxide catalyst being employed.

*Example I.*—(All parts are by weight.) Into a still equipped with a suitable fractionating column and adapted to operate under subatmospheric pressure were charged 400 parts refined filtered and dried coconut oil having a saponification value of 255, and 133 parts of dried methyl esters of soybean oil fatty acids, which esters had a saponification value of 191, giving a mixture having a saponification value of 237 (calculated 239). Following the addition of 49.3 parts of a solution of 5.2 parts potassium methoxide in 44.1 parts of methyl alcohol, the charge was heated for about 2¾ hours at 25 mm. mercury absolute pressure, the temperature being raised gradually from about 140° C. to 207° C. so as to distill off the more volatile methyl esters formed, while the less volatile esters were condensed in the fractionating column and returned to the still wherein further ester interchange could take place. Throughout the distillation period the charge was agitated by the introduction of methyl alcohol vapors, a total of 40 parts being employed.

According to analyses on the distillate and calculations based thereon, about 90% of the soybean methyl esters were converted by the process to methyl esters of fatty acids of 12 or less carbon atoms, these latter esters being removed in the distillation.

As indicated above, the same process may be conducted without the introduction of alcohol vapors during the rearrangement and distillation and this is true even when alkoxide catalysts are employed. However, although such a process results in an amount of conversion considerably higher than that obtained under conditions heretofore practiced, it will be less than that obtained when the alcohol vapor is introduced.

I have found that the introduction of the alcohol vapor is of advantage in the process when other catalysts, such as zinc stearate, are employed. For example, substantially the same result will be obtained if the process of the preceding example is modified to use 2% zinc stearate catalyst (based on the combined weight of coconut oil and soybean methyl ester) at atmospheric pressure, the maximum temperature reached being about 275° C. during the distillation.

Another way in which the reaction may be conducted rapidly and a maximum ester interchange effected is to follow a continuous procedure in which the mixture of fat, methyl ester, alcohol, and catalyst is preheated and immediately introduced into a column still wherein simultaneous rearrangement and volatilization of monohydric alcohol esters are effected. In the column the lower boiling esters formed are vaporized and distilled out of the upper end, while the unvaporized modified glycerides are discharged at the lower end.

I have described above the admixture of methyl stearate with coconut oil and ethyl oleate with palm oil, and in the specific example I have described the treatment of a preformed mixture of coconut oil and the methyl ester of the mixture of fatty acids obtained from soybean oil. It is to be understood that the present invention also embodies that process wherein a part of the fat to be rearranged is first converted to the monohydric ester in situ by mixing with a lower monohydric alcohol in sufficient quantity to form the desired amount of ester and the mixture then treated in accordance with known ester interchange processes such as by heating the mixture to the boiling point under atmospheric pressure in the presence of a suitable catalyst whereby substantially all of the monohydric alcohol is converted into fatty acid ester with the accompanying liberation of free glycerin. At least part of the free glycerin is then removed from the mixture of glyceride and monohydric alcohol ester, which mixture is then subjected to the rearrangement process above described.

The amount of lower alcohol employed will depend on the degree of rearrangement desired and will be the molecular equivalent or slightly in excess thereof of the fatty acid fraction desired to be removed. It will also depend on the oil being used and, as stated before, on the desired degree of rearrangement. In the case of coconut oil, for example, where it is desired to remove those fatty acids of lower molecular weight than lauric ($C_{12}$) acid and produce glycerides of the higher fatty acids contained in coconut oil, an amount of alcohol slightly in excess of the molecular equivalent necessary to esterify the content of acids below lauric acid in molecular weight will be employed.

It is also possible to use lower monohydric alcohol esters of any single fatty acid having a higher boiling point than corresponding lower alcohol esters producible from the fatty acids in the glycerides, or any mixture of same which may be employed to obtain the desired rearrangement. Methyl, ethyl, propyl, isopropyl and butyl esters may be used in the practice of the invention.

In the practice of that feature of my invention in which the monohydric aliphatic alcohol is introduced into the mixture of glyceride and monohydric alcohol ester and the vapors bubbled therethrough during simultaneous rearrangement and fractional distillation, the alcohol coming over with the distilled esters usually is equal approximately to the quantity introduced. A portion of the alcohol, depending upon the pressure, temperature, and other conditions employed reacts with part of the glyceride to form monohydric fatty acid ester. In some cases it will be advantageous to utilize this effect to the extent of forming all of the monohydric alcohol esters involved in the process simply by passing lower aliphatic monohydric alcohol into the glycerides while being heated in the presence of a suitable catalyst under a fractionating column. Applied to coconut oil, this method may be used to remove most of the lower boiling fatty acids, $C_6$–$C_{10}$, from the mixed glycerides of the oil. The following example will illustrate this process in more detail, it being understood, of course, that the example is merely illustrative and that I am not limited thereto:

*Example II.*—A mixture of 500 parts coconut oil and 1 parts of zinc stearate was heated to 260°–270° C. at one atmosphere pressure in a still provided with a fractionating column while methyl alcohol was passed through the charge. For about 8 hours thereafter the temperature was maintained at 260°–270° C. and methyl alcohol was introduced at an average rate of about 30 parts by weight per hour. Fractions of distillate were collected from time to time and treated to separate methyl ester from methyl alcohol. Methyl esters totaling about 13% of the charge were distilled over. The combined ester distillate had a saponification value of 309. The product in the flask contained about 25% methyl esters which were removed by distillation under vacuum. These esters had a saponification value of 245. The residual glyceride mixture had a saponification value of 236 as compared with 255 for the original oil.

The fats which respond to my method of treatment and which undergo radical change in composition and properties when subjected thereto are the natural triglyceride fats and oils and mixtures of same, including animal, vegetable and mineral fats and oils such as tallow, cottonseed oil, coconut oil, palm oil, whale oil, fish oil, etc.

The temperature at which my process may be conducted will vary somewhat depending on the mixture of fat and monohydric alcohol esters being subjected to treatment. Of course it is essential that the temperatures employed be sufficiently high to vaporize the monohydric alcohol ester under the existing pressure conditions and sufficiently high to bring about the simultaneous exchange of fatty acid in the triglyceride. Ordinarily the pressure conditions should be adjusted either above or below atmospheric pressure so that the temperature at which the esters boil will be sufficiently high to effect simultaneous rearrangement and vaporization without undesired thermal decomposition. Temperatures from 150° C. to 275° C. have been found satisfactory.

Having thus described my invention, what I claim and desire to secure by Letters Patent is:

1. A process for altering the composition of a mixture of glycerides which comprises subjecting a mixture of said glycerides and a fatty acid ester of a monohydric aliphatic alcohol having less than five carbon atoms per molecule to a temperature at which molecular change in the glyceride will take place, simultaneously vaporizing at least part of the monohydric alcohol ester present in the mixture, fractionating the vaporized esters, returning the less volatile fraction to the reaction zone to permit further reaction with the glycerides, and removing the more volatile fraction.

2. A process for altering the composition of a mixture of glycerides which comprises subjecting a mixture of said glycerides, a fatty acid ester of a monohydric aliphatic alcohol having less than five carbon atoms per molecule, and a molecular rearrangement catalyst to a temperature at which rearrangement of the glyceride structure will take place, simultaneously vaporizing at least part of the monohydric alcohol ester, fractionating the vaporized esters, returning the less volatile fraction to the reaction zone to permit further reaction with the glycerides, and removing the more volatile fraction.

3. A process for altering the composition of a fat, which comprises subjecting a mixture of a fat, a molecular rearrangement catalyst, and a fatty acid ester of a monohydric aliphatic alcohol having less than five carbon atoms per molecule, to a temperature at which ester interchange and volatilization of monohydric alcohol ester will take place without substantial thermal decomposition, the monohydric alcohol ester admixed with the fat having a higher boiling point than an ester of the same alcohol and a fatty acid combined in the glyceride, passing the vaporized esters into a fractionating column, condensing the higher boiling esters and returning same to the reaction zone, and permitting the lower boiling esters to pass through said column.

4. A process for altering the composition of a fat, which comprises subjecting a mixture of a fat, a molecular rearrangement catalyst, and an ester of an unsaturated fatty acid and a monohydric aliphatic alcohol having less than five carbon atoms per molecule, to a temperature at which ester interchange and volatilization of a monohydric alcohol ester will take place without substantial thermal decomposition, the monohydric alcohol ester admixed with the fat having a higher boiling point than an ester of the same alcohol and a fatty acid combined in the glyceride, passing the vaporized esters into a fractionating column, condensing the higher boiling esters and returning same to the reaction zone, and permitting the lower boiling esters to pass through said column.

5. A process for altering the composition of a fat, which comprises subjecting a mixture of a fat, a molecular rearrangement catalyst, and an ester of a saturated fatty acid and a monohydric aliphatic alcohol having less than five carbon atoms per molecule, to a temperature at which ester interchange and volatilization of monohydric alcohol ester will take place without substantial thermal decomposition, the monohydric alcohol ester admixed with the fat having a higher boiling point than an ester of the same alcohol and a fatty acid combined in the glyceride, passing the vaporized esters into a fractionating column, condensing the higher boiling esters and returning same to the reaction zone, and permitting the lower boiling esters to pass through said column.

6. A process for modifying the composition and properties of a glyceride fat, which comprises forming a mixture of a glyceride fat, a molecular rearrangement catalyst, and esters derived from a fat of the same general characteristics and a monohydric alcohol having less than five carbon atoms, subjecting the mixture to a temperature at which ester interchange and volatilization of monohydric alcohol esters will take place, passing the vaporized esters into a fractionating column, condensing the higher boiling esters and returning same to the reaction zone, and permitting the vaporized lower boiling esters to pass through said column.

7. A process for modifying the composition and properties of a glyceride fat, which comprises forming a mixture of a glyceride fat, a molecular rearrangement catalyst, and esters derived from the same fat and a monohydric aliphatic alcohol having less than five carbon atoms, subjecting the mixture to a temperature at which ester interchange and volatilization of monohydric alcohol esters will take place, passing the vaporized esters into a fractionating column, condensing the higher boiling esters and returning same to the reaction zone, and permitting the vaporized lower boiling esters to pass through said column.

8. A process for modifying the composition and properties of coconut oil, which comprises forming a mixture of coconut oil, a molecular rearrangement catalyst, and esters derived from coconut oil and a monohydric aliphatic alcohol having less than five carbon atoms per molecule, subjecting the mixture to a temperature at which ester interchange and volatilization of monohydric alcohol esters will take place, passing the vaporized esters into a fractionating column, condensing the higher boiling esters and returning same to the reaction zone, and permitting the vaporized lower boiling esters to pass through said column.

9. A process for modifying the composition and properties of coconut oil, which comprises forming a mixture of coconut oil, sodium methoxide catalyst, and methyl esters derived from coconut oil fatty acids, subjecting the mixture to a temperature at which ester interchange and volatilization of methyl esters will take place, passing the vaporized esters into a fractionating column, condensing the higher boiling esters and returning same to the reaction zone, and permitting the vaporized lower boiling esters to pass through said column.

10. A process for altering the composition of a fat, which comprises subjecting a mixture of a glyceride fat and a fatty acid ester of a monohydric aliphatic alcohol having less than five carbon atoms per molecule to a temperature at which molecular change in the glyceride will take place, simultaneously vaporizing at least part of the monohydric alcohol ester present in the mixture, passing vapor of an aliphatic monohydric alcohol having less than five carbon atoms through the reaction mix during the reaction and vaporization, fractionating the vaporized esters, returning the less volatile fraction to the reaction zone to permit further reaction with the glycerides, and removing the more volatile fraction.

11. A process for altering the composition of a glyceride fat, which comprises subjecting a mixture of a glyceride fat, an alkali metal alcoholate catalyst, and a fatty acid ester of a monohydric aliphatic alcohol having less than five carbon atoms per molecule, to a temperature at which ester interchange will take place, simultaneously vaporizing at least part of the monohydric alcohol ester present in the mixture, passing vapor of an aliphatic monohydric alcohol having less than five carbon atoms through the reaction mix during the reaction and vaporization, fractionating the vaporized esters by passage into a fractionating column, returning the less volatile fraction to the reaction zone to permit further reaction with the glycerides, and removing the more volatile fraction.

12. A process for altering the composition of coconut oil, which comprises subjecting a mixture of coconut oil, alkali metal methoxide and methyl alcohol esters derived from coconut oil fatty acids, to a temperature at which ester interchange will take place, simultaneously vaporizing at least part of the methyl esters present in the mixture, passing methyl alcohol vapor through the reaction mix during the reaction and vaporization, fractionating the vaporized esters by passage into a fractionating column, returning the less volatile fraction to the reaction zone to permit further reaction with the glycerides, and removing the more volatile fraction.

13. A process for altering the composition of coconut oil, which comprises subjecting a mixture of coconut oil, potassium methoxide, and an amount of methyl alcohol slightly in excess of that necessary to form methyl esters of fatty acids having less than twelve carbon atoms present in the coconut oil, to conditions under which methyl esters will form, thereby forming a mixture containing glycerides, methyl esters, and free glycerin, separating at least a part of the free glycerin, subjecting the resulting mixture to a temperature at which ester interchange and simultaneous vaporization of methyl esters will take place, passing the vaporized esters into a fractionating column, condensing the higher boiling esters and returning the same to the reaction zone and permitting the vaporized low boiling esters to pass through said column.

14. A process for altering the composition of coconut oil, which comprises subjecting a mixture of coconut oil, potassium methoxide, and an amount of methyl alcohol slightly in excess of that necessary to form methyl esters of fatty acids having less than twelve carbon atoms present in the coconut oil, to conditions under which methyl esters will form, thereby forming a mixture containing glycerides, methyl esters, and free glycerin, separating at least a part of the free glycerin, subjecting the resulting mixture to a temperature at which ester interchange and simultaneous vaporization of methyl esters will take place, passing the vaporized esters into a fractionating column, condensing the higher boiling esters and returning the same to the reaction zone and permitting the vaporized low boiling esters to pass through said column, the process being continued until substantially all methyl esters are distilled off.

15. A process for altering the composition of a mixture of glycerides which comprises introducing an aliphatic monohydric alcohol having less than five carbon atoms in the molecule into a body of a mixture of glycerides in the presence of an ester interchange catalyst at a temperature at which esters of the aliphatic monohydric alcohol are formed and vaporized, passing the vaporized esters through a fractionating column, condensing the higher boiling esters and returning same to the reaction zone, and permitting the lower boiling esters to pass through said column.

16. A process for altering the composition of a mixture of glycerides which comprises passing vapor of an aliphatic monohydric alcohol having less than five carbon atoms in the molecule into a body of a mixture of glycerides in the presence of an ester interchange catalyst at a temperature at which esters of the aliphatic monohydric alcohol are formed and vaporized, passing the vaporized esters through a fractionating column, condensing the higher boiling esters and returning same to the reaction zone, and permitting the lower boiling esters to pass through said column.

17. A process for modifying the composition of coconut oil which comprises introducing an aliphatic monohydric alcohol having less than five carbon atoms in the molecule into a body of coconut oil containing an ester interchange catalyst at a temperature at which esters of the aliphatic monohydric alcohol are formed and vaporized, passing the vaporized esters through a fractionating column, condensing the higher boiling esters and returning same to the reaction zone, and permitting the lower boiling esters to pass through said column.

18. A process for modifying the composition of coconut oil so as to remove most of the fatty acids having less than twelve carbon atoms, which comprises passing methyl alcohol vapor through a body of coconut oil containing an ester interchange catalyst at a temperature at which methyl esters will be formed and vaporized, passing the vaporized esters through a fractionating column, condensing the higher boiling esters and returning same to the reaction zone, and permitting the lower boiling esters to pass through said column.

EDDY W. ECKEY.